United States Patent
Muchow et al.

(10) Patent No.: US 7,055,392 B2
(45) Date of Patent: Jun. 6, 2006

(54) MICROMECHANICAL PRESSURE SENSOR

(75) Inventors: Joerg Muchow, Reutlingen (DE); Hubert Benzel, Pliezhausen (DE); Roland Guenschel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 10/881,382

(22) Filed: Jun. 30, 2004

(65) Prior Publication Data
US 2005/0000292 A1  Jan. 6, 2005

(30) Foreign Application Priority Data
Jul. 4, 2003 (DE) ................. 103 30 252
Oct. 7, 2003 (DE) ................. 103 46 572
Feb. 9, 2004 (DE) ............ 10 2004 006 197

(51) Int. Cl.
*G01L 7/08* (2006.01)
(52) U.S. Cl. .......................... 73/715; 73/753
(58) Field of Classification Search ........... 73/700–756
See application file for complete search history.

(56) References Cited

U.S. PATENT DOCUMENTS

| | | | |
|---|---|---|---|
| 5,731,703 A * | 3/1998 | Bernstein et al. | 324/256 |
| 6,350,630 B1 * | 2/2002 | Wildgen | 438/51 |
| 6,357,298 B1 * | 3/2002 | Draxelmayr et al. | 73/724 |
| 6,365,424 B1 * | 4/2002 | Bauer et al. | 438/15 |
| 6,559,661 B1 * | 5/2003 | Muchow et al. | 324/725 |
| 6,649,989 B1 * | 11/2003 | Benzel et al. | 257/419 |
| 6,688,156 B1 * | 2/2004 | Dietrich et al. | 73/1.68 |
| 6,782,756 B1 * | 8/2004 | Muchow et al. | 73/754 |

FOREIGN PATENT DOCUMENTS

| | | |
|---|---|---|
| DE | 41 30 044 | 3/1992 |
| DE | 197 01 055 | 7/1998 |
| DE | 199 57 556 | 5/2001 |

* cited by examiner

*Primary Examiner*—Edward Lefkowitz
*Assistant Examiner*—Jermaine Jenkins
(74) *Attorney, Agent, or Firm*—Kenyon & Kenyon LLP (57) ABSTRACT

A micromechanical pressure sensor which is made up of at least one first component element and a second component element bordering on the first component element. In this context, the first component element includes at least one diaphragm and one cavity. The cavity is arranged or structured so that the medium to be measured gains access to the diaphragm through the cavity. In addition, in the second component element an opening is provided which guides the medium to be measured to the cavity. At least a part of the cavity represents an extension, without a transition, of the opening in the second component.

9 Claims, 4 Drawing Sheets

MICROMECHANICAL PRESSURE SENSOR

FIELD OF THE INVENTION

The present invention relates to a pressure sensor and a method for manufacturing a pressure sensor, in which a pressure difference is measured as a function of the deformation of a diaphragm.

BACKGROUND INFORMATION

German patent documents nos. 197 01 055 and 199 57 556 refer to and discuss micromechanical semiconductor pressure sensors which have a frame made from a semiconductor substrate and a diaphragm disposed on the frame. In this context, mounted on the diaphragm are various piezoresistive measuring resistors which change their resistance value in response to a deformation of the diaphragm or of the resistors (as a result of a differential pressure between the upper side and the lower side of the diaphragm). The frame and the diaphragm are formed, in this context, from a silicon substrate by masking and subsequent etching of the back side. A potassium hydroxide etching solution (KOH etching solution) may be used for producing a cavity having a truncated pyramid shape tapering in the direction of the lower side of the diaphragm and having a trapezoidal cross-section.

German patent document no. 41 30 044 refers to and discusses a semiconductor pressure sensor which includes a silicon substrate having a diaphragm on a base made of borosilicate glass. In this context, the diaphragm is etched anisotropically from the silicon substrate, using a KOH-water solution or the like, a depression having typical angle measurements being created. The base, as against this, has a central hole for pressure application, via which the diaphragm is able to communicate with the outside.

SUMMARY OF THE INVENTION

The present invention is to a micromechanical pressure sensor which is made up of at least one first component (structural element) and a second component bordering on the first component. In this context, it is provided that the first component includes a diaphragm and a cavity. It is also provided that the cavity is designed in such a way that the medium to be measured gains access to the diaphragm through the cavity. In addition, in the second component an opening is provided which guides the medium to be measured to the cavity. With the exemplary embodiment and/or exemplary method of the present invention, at least a part of the cavity represents an extension, without a transition, of the opening in the second component.

According to the exemplary embodiment and/or exemplary method of the present invention, the cavity in the first component is a hollow space which may be subdivided into at least two parts. In this context, a second cavity represents the access to the diaphragm and the first cavity represents the transition from the opening in the second component to the second cavity. In this context, it is advantageously provided that the second cavity represents at least a part of the first cavity. In addition, in one exemplary embodiment of the present invention, the second cavity has a smaller diameter than the first activity. That has the advantage that a tapering of the access of the medium to be measured through the opening in the second component to the diaphragm takes place completely in the first component.

Advantageously, the materials of which the first and second components are made are selected in such a way that they may be combined harmonically with each other. This may, for instance, take place in that the first component is made at least partially of silicon and/or the second component is made at least partially of glass. In addition to that, advantageously the diaphragm and the first component are produced of the same material. In another exemplary embodiment of the present invention, on the side of the second component that lies opposite the first component, at least partially a layer is applied for the purpose of preventing a roughening of the surface of this side by the manufacturing process. In the case of this layer, for instance, a metal-containing layer, photo-resist or other type of layer may be involved that serves the same purpose. The measurement of the pressure may take place via piezo elements on the diaphragm. For this, the medium having the pressure to be measured is guided through the opening in the second component. According to the exemplary embodiment and/or exemplary method of the present invention, the dimensions of the first cavity and the opening in the second cavity are aligned with each other in such a way that the transition from the opening to the first cavity shows a steady course. This may be achieved, for example, in that the opening and the first cavity have essentially equal diameters.

In an exemplary embodiment of the present invention, the manufacturing process of the pressure sensor includes various steps which may be combined in different ways. Whereas one step includes the manufacturing of a diaphragm in a first component, such as by a trench process, another step includes the connection of the first component to a second component. This second component has an opening through which a further trench process may be carried out in the first component. In an optional way, the connection of the first and the second components may also take place before the manufacturing of the diaphragm in the first component.

Advantageously, a first and a second trench process are carried out simultaneously. Alternatively to this, the same trench process may be involved in this context, the diaphragm and/or the cavity in the first component first being generated by a trench process through the opening in the second component. If two trench processes are carried out, then, in one exemplary embodiment of the present invention it is provided to adjust to each other the trench depth, i.e. the depth down to which material is dissolved from the first component, of the first and the second trench process.

In another exemplary embodiment of the present invention, a cavity is generated in the first component before its connection to the second component. This cavity may, for example, be produced by a first trench process. In this context, advantageously, markings are applied to the first component which simplify the alignment of the second component to the first component when they are connected. This may allow, for example, the alignment of the opening of the second component with the cavity in the first component. A common method of applying markings in this case is to design alignment cavities in a cruciform manner, for example.

Advantageously, for the manufacturing of cavities, trench processes are used that have a high aspect ratio, i.e. depth to width ratio. By the use of such trench processes, specified depressions having steep sidewalls may be generated in a substrate.

In a further exemplary embodiment, a glass wafer, made of a glass material, is used as the second component which has at least one opening. To produce the at least one opening in the glass wafer, various manufacturing steps are provided. Advantageously, in this context, at first the glass surface of the glass wafer is ground, polished or lapped. In a further method step, one or more openings are drilled into the glass wafer. This may be done, for example, by ultrasound drilling, laser drilling or sandblasting. Typically, in such material treatments, masking is used in order to achieve a desired positioning of the openings. Another exemplary embodiment of the present invention is provided if the glass wafer thus drilled is submitted to a thermal treatment (tempering). By this thermal treatment, the bursting pressure of the glass wafer becomes advantageously greater. Subsequently, fine grinding, polishing or lapping of the glass surfaces is performed. In this context, lapping produces a rougher surface than, for instance, grinding or polishing, and thus provides a better adhesion of an optional surface coating.

In one exemplary embodiment of the present invention, a first component, which may be made of a semiconductor material, is connected to a second component which has openings or bores. In order to reduce the aligning effort and to lessen or avoid the alignment of the openings to cavities already present in the first component, it is provided in this special specific embodiment that one should carry out or perform only one trench process, after connecting the two components, through the opening in the second component. In this context, advantageously, a cavity and a diaphragm are produced that may be used to record a pressure. Because of such a self-alignment in the manufacturing of the cavity as an extension of the opening, an offset of the cavity in the first component from the openings in the second component can be avoided. Furthermore, no steps are created in the transition from the one component to the other component, whereby resistance to excess pressure is increased at this material transition.

DETAILED DESCRIPTION

Figure 1:
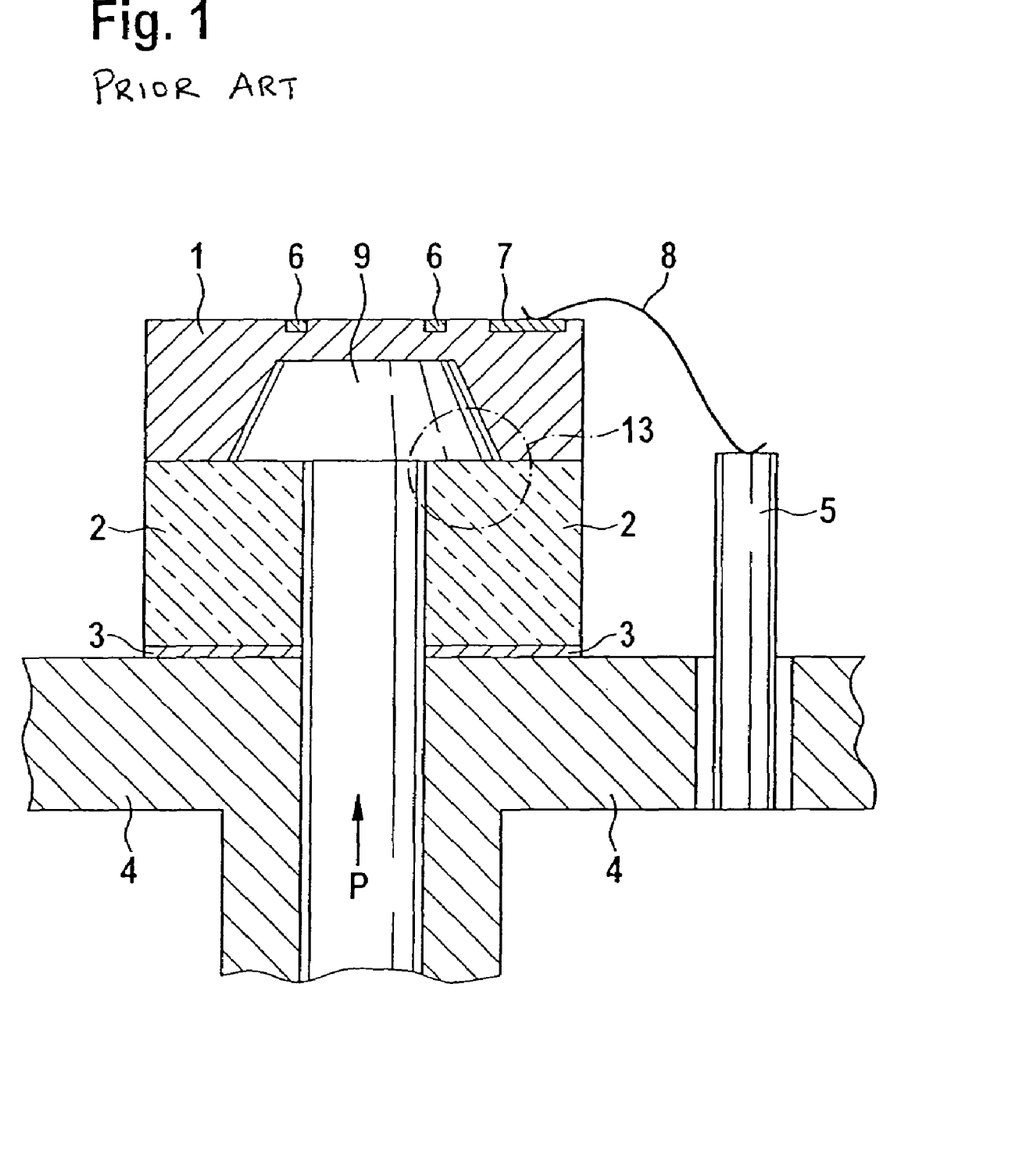
FIG. 1 shows a pressure sensor according to the related art.

A sensor construction shown in FIG. 1 represents the related art. Here, a sensor chip 1 is anodically bonded to a glass intermediate layer or glass header 2, made of sodium-containing glass. Glass header 2 is metallized on its back side and is fastened onto a metal base 4 (such as a TO8 base) using solder 3. In this context, sensor chip 1 from the related art may me made up of a pure resistance bridge having piezoresistive resistors 6, or it may be made up combined with an evaluation circuit 7 which, together with the piezoresistive resistors 6, are integrated in a semiconductor process. Piezoresistive resistors 6 and/or evaluation circuit 7 are conducted on via appropriate contacting 8 to a terminal 5, which enables passing on the measuring signals to control and regulating systems.

The diaphragm in the pressure sensor shown in FIG. 1, according to the related art, is produced by anisotropic etching, using, for instance, KOH or TMAH. However, in an application of the pressure sensor in the high pressure field, in the case of the illustrated construction of the sensor, there may be a shortened service life, since this manner of construction is only arranged or designed for low to medium pressure ranges. What is characteristic in this context is, for example, small transition radii between the cavity sides and the diaphragm. These transition radii are particularly small, above all in time-etched diaphragms. Because of these small transition radii, great mechanical strains come about at the transition, which lower the bursting pressure. Furthermore, because of the anisotropic etching, a typical cavity 9 comes about having flat cavity walls which have slopes of 54°. These flat cavity walls offer a very large surface of attack to the pressure applied, on which the medium that is under pressure can exert a force on silicon chip 1. At the same time, as shown in FIG. 1, the bonding surface (connecting surface silicon to glass) also becomes smaller in the etching process using the flat cavity walls in silicon chip 1, whereby the load per unit area is even increased. Both points, (large surface of the cavity walls and small bonding area) lead to a lower bursting pressure. The step (region 13 in FIG. 1) created at the transition from silicon to glass, at pressure loads leads to great mechanical strains in the glass, which likewise diminishes the bursting pressure. In order to avoid further negative influences, for glass header 2, glasses are mostly used that demonstrate a temperature coefficient adapted to the silicon. Consequently it may be achieved that a lower long-term drift, a lower temperature dependence or temperature hysteresis are produced in the output signal of the sensor.

Usually, the cavities are produced before the anodic bonding (see the related art in FIG. 1). The openings in glass header 2, through which the medium, having the pressure to be measured, is conducted to the diaphragm, are, in this context, made to coincide as well as possible with sensor chip 1 by an alignment process. In anisotropically etched diaphragms, the cavities or openings in silicon are in general very large. However, if the diaphragms are trenched, even small cavities or openings may be produced in silicon, which may be as large as feed-through openings in the glass header. In the alignment of the openings in the glass header to the sensor chips, in this context, of necessity it occurs within the scope of the alignment tolerances, of a few micrometer, that steps are created in the transition of silicon to glass, no matter how the diaphragms are manufactured. Such steps (region 13), however, are critical, since great mechanical strains are created at the transition location, when the sensor is loaded with the application of the pressure. At the transition location, tangential forces make their appearance, which become a maximum at the inner side of the pressure supply (for this, see FIG. 1, region 13). Since the resistance to breaking of glass is lower than that of silicon, cracks may occur in the glass which, at a certain pressure, may lead to breaking of the glass, and thereby of the entire sensor. This bursting pressure may, however, be greatly increased if these steps are avoided.

A further possibility of increasing the bursting pressure of the glass and the glass wafer having the openings is to treat the glass wafer after drilling the openings, using a special tempering step. In order to produce a glass wafer having one or several openings, first of all the glass surface of a glass wafer is ground or lapped. Subsequently, the openings or through holes may be drilled into the glass wafer by various methods. In this context, typically methods such as ultrasound drilling, laser cutting or laser drilling, or sandblasting are used. In order to position the openings appropriately on the glass wafer, masking such as by "shadow masking" (X-ray lithography masking) is used during the drilling procedure. In the glass material of the glass wafer, smaller (micro-) or larger (macro-) cracks may have developed, for instance, even during manufacturing of the glass wafer or on account of the drilling that was performed. Since these cracks substantially influence the bursting strength of the glass wafer, in one special exemplary embodiment it is provided that, after the drilling of the openings (through holes), the glass wafer is to be submitted to thermal treatment. In such a tempering, if a temperature is reached that lies close to the transformation temperature (as a rule between 500° C. and 800° C., depending on the type of glass) of the glass material being used, small cracks seal in such a way that a crack-free, smoother surface is created. Larger cracks or scratches, or grooves in the surface are rounded off. All in all, using this thermal treatment, a greater mechanical load-bearing capacity and bursting pressure of the glass may be achieved. Finally, fine grinding/lapping and polishing of the glass surface to the target thickness of the glass wafer are performed. Polishing on the lower side is optional. If the back side is to be metallized, it may be a rough surface, which can be produced better by lapping. The back side metallization adheres better because of the increased surface area achieved thereby.

An additional possibility of increasing the bursting pressure is by reducing the diameter of the glass bore. However, this also has implications for the sensor diaphragm, which is why making the glass opening smaller can be performed only to certain limits. Thus, a minimum diameter of the glass opening must be maintained, so that the bore does not become clogged by particles in the medium to be measured.

A sensor adapted to higher pressures should generally have the following properties:

small transition radii from cavity side to diaphragm vertical cavity walls self-aligning transition in the silicon glass These properties are fulfilled according to the exemplary embodiment and/or exemplary method of the present invention by a pressure sensor shown in the following exemplary embodiment and in FIG. 2. The large transition radii are achieved, in this context, by another diaphragm manufacturing method. A diaphragm manufacturing method, by which the corresponding large transition radii may be produced, is so-called trenching (e.g. ASE process), by which a high aspect ratio (ratio of the depth to the width of the cavity produced) may be achieved. By trenching, almost vertical cavity walls, and thus, small pressure attack surfaces, are produced, whereby a high bursting pressure is achieved. According to the manufacturing method of the present invention, shown in FIGS. 3a to d, the cavity in the silicon may be aligned exactly to the glass opening, and formation of a step may thus be avoided.

Figure 3A:
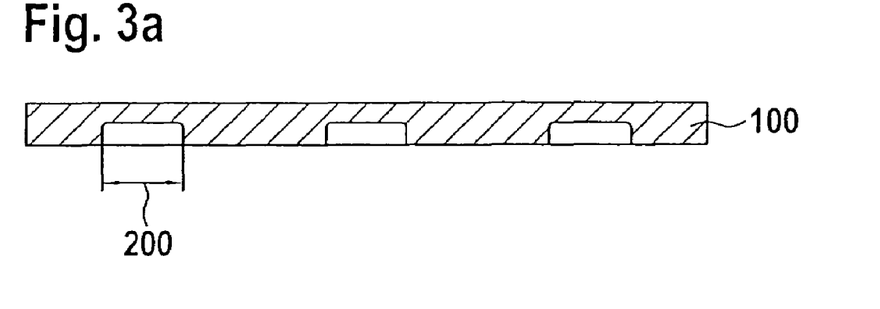
FIG. 3a shows various steps that are carried out or performed during the manufacturing method to make the pressure sensor.

As shown in FIG. 3a, to produce the pressure sensor according to the present invention, cavities having a diameter d (200) are produced in a first trench etching step on the back side of a material 100 forming the sensor chip, made, for instance, of silicon. In this context, the trench etching step generates a thin diaphragm in silicon material 100, using, for example, a mask which may be of photo-resist or a structured hard mask (such as of silicon oxide). Optionally, before the first trench etching step, on the front side of the silicon, piezoresistors 6 and/or parts of semiconductor circuit 7 may be applied by suitable manufacturing processes.

In the present manufacturing method, since, at a later point in time, a second trench etching step will take place, the trench depth of the second trench etching step has to be kept in mind so that one may later obtain the desired diaphragm thickness.

Figure 3B:
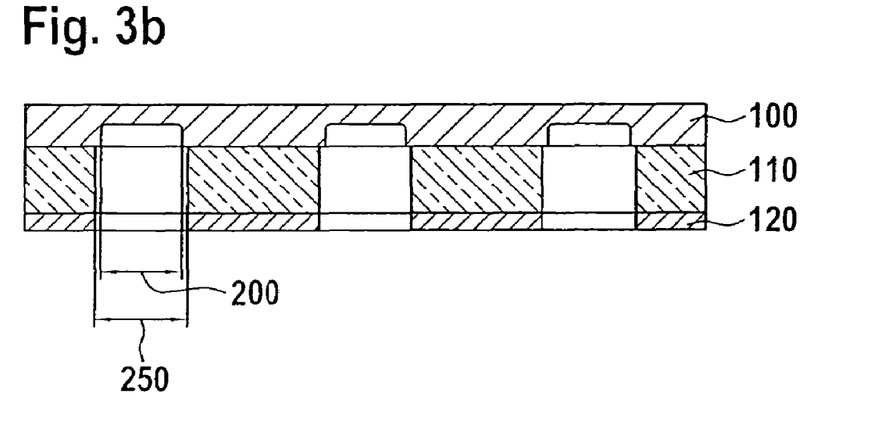
FIG. 3b shows various steps that are carried out or performed during the manufacturing method to make the pressure sensor.

As shown in FIG. 3b, in the next step, anodic bonding of a glass plate 110, furnished with holes, onto pre-trenched silicon wafer 100 is performed, the holes in glass plate 110 being aligned with alignment marks in silicon 100 and having a diameter of D(250). The alignment marks in silicon 100 may, in this case, be applied during the first trench etching step, together with the cavities. In this context, the comment should especially be made that the holes of glass plate 110 have a greater diameter (D>d) than the openings of the cavities generated in the first trench etching step, so that, in the second trench etching step, one may avoid a step formation between glass plate 110 and silicon wafer 100.

Figure 3C:
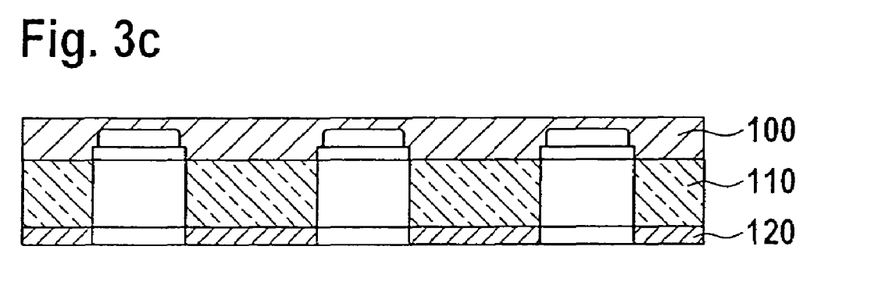
FIG. 3c shows various steps that are carried out or performed during the manufacturing method to make the pressure sensor.
Figure 3D:
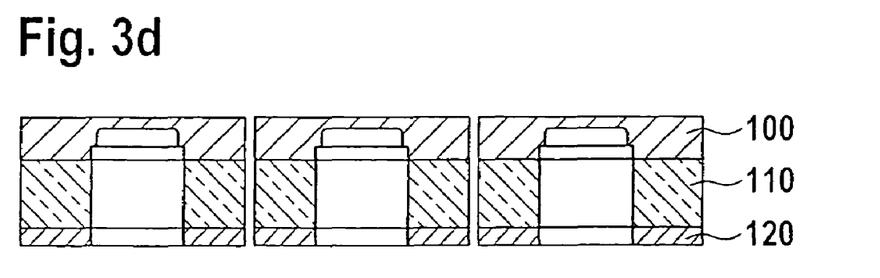
FIG. 3d shows various steps that are carried out or performed during the manufacturing method to make the pressure sensor.

Optionally, glass plate 110 having the holes may be metallized before or after the anodic bonding on the back side (the side facing away from the silicon) and this is (layer 120 in FIGS. 3b to 3d). This has the advantage, during trenching, that the glass surface must not be flash- etched, and thus not become rough. If the sensor chip is soldered into a housing, metallization must in any case be performed, which may be done using CrNiVAg or CrNiVAu (instead of chromium, titanium may also be used). In this context, the metallization does not mean an additionally required manufacturing step, but only represents the advancement of a necessary process step. In order to avoid contamination of the trench system with, for instance, gold and silver (top layer), the metallization can take place only partially before or after the anodic bonding, for instance, metallizing with chromium can be performed, and only after the second trench etching step the remaining metallization is applied, using, for example, NiVAu. Alternatively, the back side of the glass may also be coated with photo-resist, for example, to protect against flash-etching. However, after trenching, the photo-resist has to be removed again.

To produce a smooth transition of glass bore to trench opening, a second trench etching step is carried out. As shown in FIG. 3c, bonded glass plate 110 is used as a mask, in this case, during the second trench etching step. The transition of the various diameters of the openings in glass plate 110 and the cavities produced in the first trench etching step in silicon wafer 100 is, in this case, shifted to the silicon.

The second trench etching step may be carried out or performed using an ASE process. The sodium-containing glass plate 110 having the through holes found therein is used here as trench mask, since it has a high selectivity during silicon etching, similar to $SiO_2$ or certain photo-resists. If the diameter of glass holes D (250) is greater than diameter d (200) of the cavity in the first trench etching process in silicon, glass diameter D (250) is transferred into the silicon, so that a step-free transition of silicon to glass is created. This stepless transition may be clearly seen in FIG. 3c and in FIG. 2 in region 12. An offset, that is unavoidable in practice, of the openings in the glass and the cavities located in the silicon, in response to the application of openings of similar dimensions, is thus prevented. Because of this shifting, the step is in the silicon, which has a greater rigidity than glass, and can consequently assume higher mechanical strain. Greater bursting pressures may be achieved using this shifting of the step and the greater rounding radii of the step during trenching. Since glass plate 110 is used as a mask, and does not have to be taken off, a self-alignment comes about in response to the second trench etching step. Since in this second trench etching step the silicon is etched both in the elongation of the glass opening and in the diaphragm, the trench depth has to be aligned with the first trench etching step. Favorably, a cavity 10 is produced in the first trench etching step for generating the diaphragm, in which the trench depth of the second trench etching step is kept in mind. During the second trench etching step an additional cavity 11 is then produced in silicon wafer 100, which partially enlarges cavity 10 and thins out the diaphragm.

The dicing up of the sensors, for instance, by sawing apart the glass-silicon combinations produced, is shown in FIG. 3d. These individual pressure sensors may subsequently be mounted into appropriate housings using standard processes. The fastening of the pressure sensor to the mounting support and the contacting to the evaluation circuits correspond, in this context, to a pressure sensor produced in a conventional manner (FIG. 1). A current method for this is to adhere the chip to glass or to solder it to an appropriate sensor mounting support.

Figure 2:
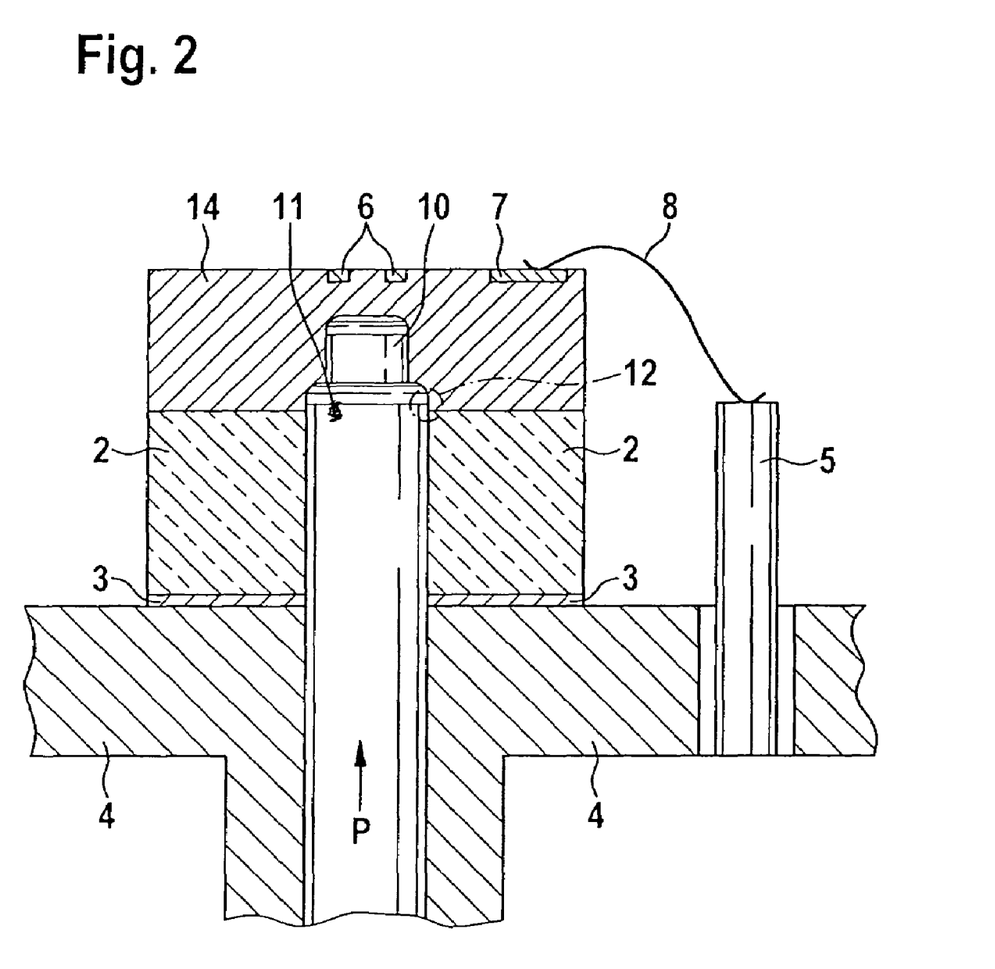
FIG. 2 shows a pressure sensor according to the exemplary embodiment of the present invention, using the manufacturing method described herein.

Using the exemplary method of the present invention, a pressure sensor can consequently be produced as is shown, for example in FIG. 2. The essential changes in comparison to a pressure sensor according to the related art, as is shown in FIG. 1, is that, at the transition from sensor chip 14 to glass element 2, no offset or no step occurs. It is clear to see that in region 12 of FIG. 2 as compared to region 13 in FIG. 1. Furthermore, it may be seen by comparing the two figures that sensor chip 14 displays a small area to the medium which is to be measured with regard to pressure. Because of this smaller area, a lower force acts on sensor chip 14 as compared to a sensor chip 1, and this, in connection with the greater bonding surface between sensor chip 14 and glass header 2, leads to a greater bursting pressure.

Because of the simple manufacturing method of the pressure sensor, any desired diaphragm geometry may be selected. Consequently, besides round diaphragms, even angular or oval diaphragms are usable.

Figure 4A:
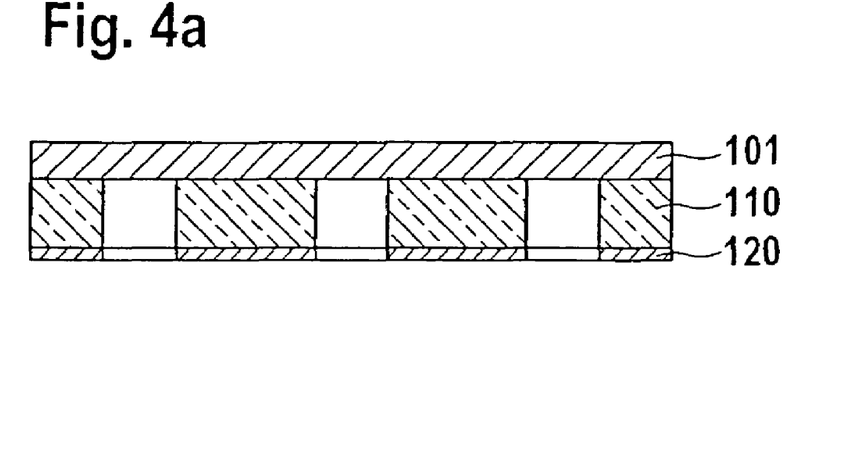
FIG. 4a shows various manufacturing steps for making the pressure sensor.
Figure 4B:
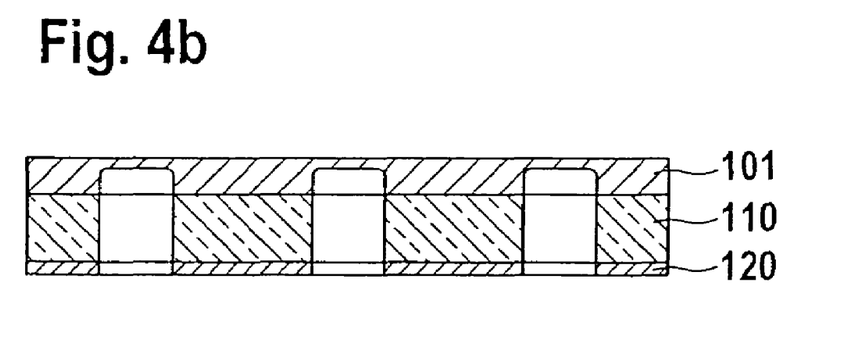
FIG. 4b shows various manufacturing steps for making the pressure sensor.

In one further exemplary embodiment, in a first manufacturing step of the pressure sensor, glass wafer 110 that is furnished with drilled openings, as shown in FIG. 4a, is applied to a semiconductor wafer 101, the two wafers may be anodically bonded. In this context, a silicon wafer is favorably used, since, in this context, the additional processing by micromechanical processes is able to be made particularly simple. If, before the trenching process, piezo resistors and circuit elements are applied on the upper side of wafer 101 through the openings located in glass wafer 110, the openings should be aligned with the corresponding positions of the piezo resistors and circuit elements. Using a trench process (ASE process), a diaphragm is generated in wafer 101, as shown in FIG. 4b. Glass plate 110 containing, for example, sodium and having the through holes found therein acts here as a mask, since it has a high selectivity during silicon etching, similar to $SiO_2$ or certain photo-resists. Since glass plate 110 is used as a mask, not aligned with openings (cavities) that are present in the silicon but only aligned with the structure (piezo resistors) on the front side, and also does not have to be removed again, one may speak here of self-alignment. By this procedure, additionally an expensive structuring process is avoided (such as depositing silicon oxide or silicon nitride, applying a photo-resist layer, exposing, developing, etching oxide or nitride, removing the photo-resist layer), and consequently it saves costs.

Figure 4C:
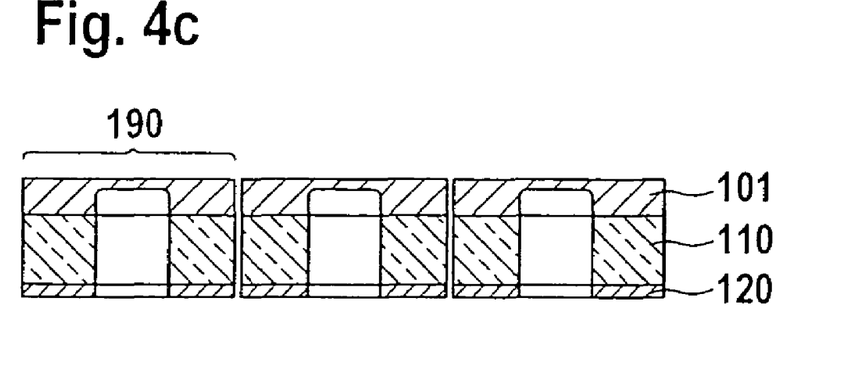
FIG. 4c shows various manufacturing steps for making the pressure sensor.

Subsequently, as shown in FIG. 4c, the pressure sensor can be cut into single pieces and mounted in a housing. In this context, the mounting is performed by standard procedures, such as adhesion of the single chips 190 to glass or metallization of the back side and subsequent soldering.

Optionally to the procedure already described, glass plate 110 may also be metallized, using a metal layer 120, on the back side, i.e. the side facing away from the silicon, before or after the anodic bonding. This procedure has the advantage, during trenching, that the glass surface is not flash-etched, and would thereby become rough. If sensor chip 190 is soldered into a housing, the metallizing step then required may be saved. In this case, the metallizing may take place using CrNiVAg or CrNiVAu, instead of Cr, Ti being also usable. The metallization does not, in this context, represent an additional step, but is only advanced.

Using a manufacturing process shown in FIGS. 4a–c, diaphragm sensors may be produced in a first component 101, whose cavities are adjusted to the size of the through holes in second component 110. Consequently, alignment of the two components having the alignment tolerance connected therewith in a prefabrication of the cavity in the first component is thus no longer necessary. Consequently, steps in the transition may be avoided. In order to avoid contamination of the trench system with, for instance, gold and silver (top layer), the metallization can take place only partially before or after the anodic bonding, for instance, metallizing with chromium can be performed, and, only after the second trench etching step, the remaining metallization is applied, using, for example, NiVAu. Alternatively, the back side of the glass may also be coated with photo-resist, for example, to protect against flash-etching. However, after trenching, the photo-resist has to be removed again.

What is claimed is:
1. A micromechanical pressure sensor, comprising:
a first component; and
a second component bordering on the first component;
wherein:
the first component includes at least one diaphragm and one cavity,
the cavity providing an access of the medium to be measured to the diaphragm,
the second component includes an opening, and
the cavity represents an extension of the opening first component is anodically bonded to the second component, the first component includes at least partially silicon, the diaphragm in the first component is made of the same material as the first component, the second component includes at least partially a metallization on the side opposite the first component, the second component has glass, Pyrex, Duran or Tempax, a pressure measurement of the pressure sensor takes place on the diaphragm by piezo elements, the medium having the pressure to be measured is guided through the opening in the second component, and the dimensions of the first cavity and the opening are aligned with one another so that at least one of the following is satisfied: (i) a transition from the wall of the opening to the wall of the first cavity has a stepless course; and (ii) the opening and the first cavity have essentially equal diameters.

2. The pressure sensor of claim 1, wherein the cavity in the first component includes a first cavity and at least a second cavity, the second cavity bordering on the diaphragm, and the first cavity representing a transition from the opening in the second component to the second cavity, and at least one of the following is satisfied:

the second cavity has a smaller diameter than the first cavity, and the second cavity represents at least a part of the first cavity.

3. A method for making a pressure sensor, the method comprising:

connecting a first component to a second component having at least one opening or bore, and performing a trench process in the first component through the opening or bore in the second component;

wherein the pressure sensor includes a micromechanical pressure sensor, and includes:

the first component; and the second component bordering on the first component;

wherein:

the first component includes at least one diaphragm and one cavity, the cavity providing an access of the medium to be measured to the diaphragm, the second component includes an opening, and the cavity represents an extension of the opening the first component is anodically bonded to the second component, the first component includes at least partially silicon, the diaphragm in the first component is made of the same material as the first component, at least partially, metallizing layer is applied to a side the second component lying opposite the first component, the second component includes glass, Pyrex, Duran or Tempax, a pressure measurement of the pressure sensor takes place on the diaphragm by piezo elements, the medium that has the pressure to be measured is guided through the opening in the second component, and dimensions of the first cavity and the opening are aligned with one another, so that at least one of the following is satisfied: (i) a transition from the wall of the opening to the wall of the first cavity has a stepless course; and (ii) the bore and the first cavity have essentially equal diameters.

4. The method of claim 3, wherein a second trench process is performed in the first component through the bore of the second component.

5. The method of claim 4, wherein:

the first and the second trench process are performed at the same time, or a depth of the trench of the first trench and the second trench process are aligned with each other, wherein the depth of the trench of the second trench process corresponding to the depth of the trench of the first trench process, or the depth of the trench corresponds to the depth of the cavity.

6. The method of claim 4, wherein the first trench process in the first component generates at least one cavity before connection to the second component, markings being applied to the first component by the first trench process to allow for alignment of the second component with the first component, and wherein the opening in the second component is aligned with the cavity.

7. The method of claim 4, wherein:

a second cavity is generated by the first trench process in the first component, and a first cavity is generated by the second trench process in the first component, the second cavity borders on the diaphragm, the first cavity represents a transition from the opening in the second component to the second cavity, and at least one of the following is satisfied: (i) the second cavity has a smaller diameter than the first cavity; and (ii) the second cavity represents at least a part of the first cavity.

8. The method of claim 7, wherein the trench process includes a micromechanical process having a high aspect ratio.

9. The method of claim 4, wherein the second component includes a glass wafer made of a glass material, and wherein the at least one opening in the glass wafer is made by performing the following:

grinding, polishing or lapping the glass surface, drilling the at least opening in the glass wafer by ultrasound drilling, laser drilling, sandblasting using a mask or stamping openings by a punch, thermally treating the glass wafer, and fine grinding, fine polishing or fine lapping the glass surface to provide a desired thickness of the glass wafer;

wherein a temperature in the thermal treatment of the glass wafer lies in a vicinity of a glass-transition temperature of the glass material.

* * * * *

UNITED STATES PATENT AND TRADEMARK OFFICE
CERTIFICATE OF CORRECTION

| | |
|---|---|
| PATENT NO. | : 7,055,392 B2 |
| APPLICATION NO. | : 10/881382 |
| DATED | : June 6, 2006 |
| INVENTOR(S) | : Joerg Muchow et al. |

Page 1 of 1

It is certified that error appears in the above-identified patent and that said Letters Patent is hereby corrected as shown below:

Column 6, line 21, change "D(250)" to --D (250)--

Column 6, line 33, change "flash- etched," to --flashetched,--

Column 8, on claim 1 line 52, change "of the opening first component" to --of the opening; the first component--

Column 9, on claim 3 line 30, change "of the opening the first component" to --of the opening; the first component--

Column 10, on claim 9 line 40, change "drilling the at least opening" to --drilling the at least one opening--

Signed and Sealed this

Fourth Day of December, 2007

JON W. DUDAS
*Director of the United States Patent and Trademark Office*